United States Patent [19]

Cooper

[11] Patent Number: 4,526,138

[45] Date of Patent: Jul. 2, 1985

[54] FLUID INJECTOR FOR INTERNAL COMBUSTION ENGINE

[76] Inventor: Ronald H. Cooper, 21340 Willowview, Bristol, Ind. 46507

[21] Appl. No.: 146,043

[22] Filed: May 2, 1980

[51] Int. Cl.³ .............................................. F02D 19/00
[52] U.S. Cl. ............................. 123/25 E; 123/25 L; 123/198 A; 261/18 A
[58] Field of Search ................ 123/25 A, 25 L, 25 B, 123/25 J, 25 ME, 198 A; 261/18 A

[56] References Cited

U.S. PATENT DOCUMENTS

| | | | |
|---|---|---|---|
| 1,672,992 | 6/1928 | Simmerman | 123/25 B |
| 1,677,609 | 7/1928 | Abel | 123/25 B |
| 1,964,892 | 7/1934 | Novotny | 123/25 A |
| 2,052,327 | 8/1936 | Waters et al. | 123/198 A |
| 2,460,700 | 2/1949 | Lyons | 123/25 L |
| 2,674,235 | 4/1954 | Drydyke | 123/25 B |
| 2,810,561 | 10/1957 | Rosenthal | 123/25 E |
| 4,064,842 | 12/1977 | Sherrill | 123/25 L |
| 4,119,062 | 10/1978 | Trevaskis et al. | 261/18 A |

*Primary Examiner*—E. Rollins Cross
*Attorney, Agent, or Firm*—Marmaduke A. Hobbs

[57] ABSTRACT

A fluid injector for internal combustion engines in which the fluid flow to the engine is indicated in the driver's compartment and in which a mixing chamber in the compartment communicates with a primary vacuum line of the engine and with a fluid reservoir. A valve is disposed between the reservoir and the chamber to prevent the flow of fluid from the reservoir when the engine is not running. A needle valve is disposed in a fluid inlet port for adjusting the volume of fluid entering the chamber. An adjustable air inlet port is disposed in the chamber, and a vacuum gauge is provided for monitoring the vacuum in the chamber. The vacuum from the primary vacuum line draws fluid into the chamber from the reservoir, where the fluid mixes with air and the mixture is drawn to the engine carburetor.

15 Claims, 6 Drawing Figures

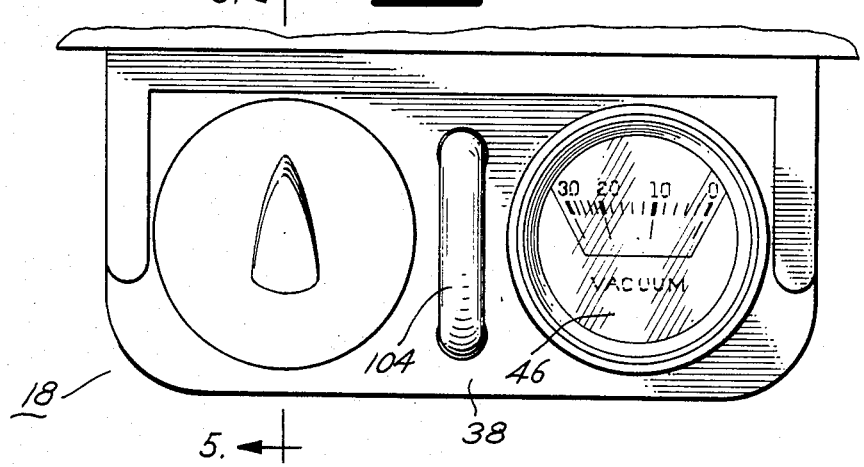
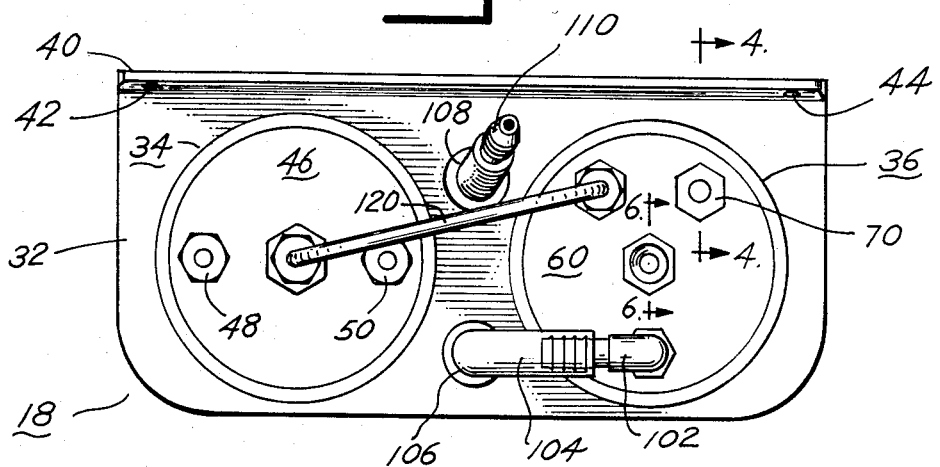
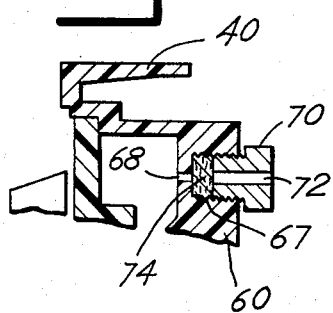
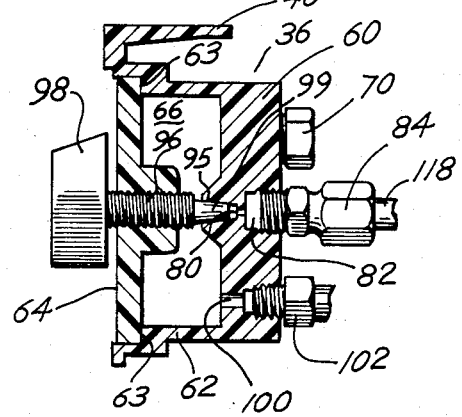
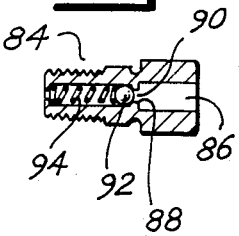

FLUID INJECTOR FOR INTERNAL COMBUSTION ENGINE

It has long been known that the injection of water or other fluids into the combustion cylinders of internal combustion engines will yield increased power and improved engine efficiency. Hence, agricultural tractors have used supplemental fluid injection systems for providing increased power when the work situation so demands, and fighter planes and other military craft have used water injection as a means for achieving sudden power boosts in combat. Commercial airlines have used water injection on many aircraft engines, for the added power needed during takeoff.

Water injection has also been found to have beneficial effects when used on automobile engines; hence, dragsters and other race cars have used water injection for the increased power obtained thereby. Increasing fuel prices and decreasing fuel supplies have led to the investigation of the use of water injection to accomplish more than just increased engine power. It has been found that water injected into the combustion cylinders of conventional automobile engines causes more complete and even combustion of the fuel therein. The result is not only an increase in power, but also a decrease in fuel consumption. The increased fuel economy resulting therefrom makes a simplified water injection system particularly desirable for automobile engines. Since more efficient and complete burning of the fuel results from water injection, many secondary advantages are realized which result in maintenance cost savings. Residual components of combustion in the cylinder are substantially reduced; hence, carbon buildup within the cylinders and on the sparkplugs is reduced, as are harmful exhaust emissions. The use of a water injection system on an older vehicle will remove the carbon buildup which exists in the engine, and will clean the vehicle exhaust system. Sparkplugs having only a minimal amount of carbon buildup will not burn out, and a clean vehicle exhaust system is less likely to retain water, and is therefore less likely to rust. Tune-ups are needed less frequently, and exhaust system replacement is required less often. As a result of the cooling effect of the water injected into the combustion cylinders, the operating temperature of the engine is substantially lowered, and engine wear is reduced.

Previous fluid injectors for internal combustion engines have operated effectively to accomplish many of the above objectives when initially installed; however, the previous injectors have not operated effectively over extended periods of time. Excessive amounts of water in the fuel system of a vehicle create difficulty in starting the engine. To prevent siphoning of water from the water reservoir of the injection system into the engine when the engine is not running, slidable pistons that are responsive to the engine vacuum have been used. The principal difficulty with the vacuum responsive pistons has been that mineral deposits accumulate on the pistons, preventing the proper functioning thereof, thus permitting siphoning to occur. Even a small amount of siphoning will result in moisture buildup in the engine sufficient to create engine starting difficulties, and minor deposits of minerals on the slidable pistons can permit siphoning in previous injectors.

It is therefore one of the principal objects of the present invention to provide a fluid injector for internal combustion engines which will store and inject fluid into the combustion cylinders of an internal combustion engine, and which minimizes the accumulation of mineral deposits within the injector.

Another object of the present invention is to provide a fluid injector for internal combustion engines which will clean and remove carbon buildup from older engines and exhaust systems, and which will reduce the operating temperatures of the engine while providing a more complete and even combustion of the fuel, resulting in increased power from the engine and a decrease in fuel consumption.

Still another object of the present invention is to provide a fluid injector for internal combustion engines which reduces the frequency of required engine tune-ups and increases the life expectancy of the exhaust system and sparkplugs of the vehicle, and which prevents siphoning from the fluid reservoir when the engine is not running.

A still further object of the present invention is to provide a fluid injector for internal combustion engines which enables the engine to run cleaner and quieter, and in which the operator of the vehicle can observe the operation of the injector and make adjustments from the driver's compartment, and which is simple in construction and operation and can be installed by one with minimal mechanical skills using conventional tools.

Additional objects and advantages of the present fluid injector for internal combustion engines will be apparent from the following detailed description and the accompanying drawings wherein:

FIG. 2 is an elevational view of the front of the fluid injector control unit;

FIG. 3 is an elevational view of the back of the fluid injector control unit;

FIG. 4 is a cross sectional view of the injector shown in FIG. 3, taken on line 4—4 of the latter figure;

FIG. 5 is a cross sectional view of the fluid injector shown in FIG. 2, taken on line 5—5 of the latter figure; and FIG. 6 is a cross sectional view of the fluid injector shown in FIG. 3, taken on line 6—6 of the latter figure.

Figure 1:
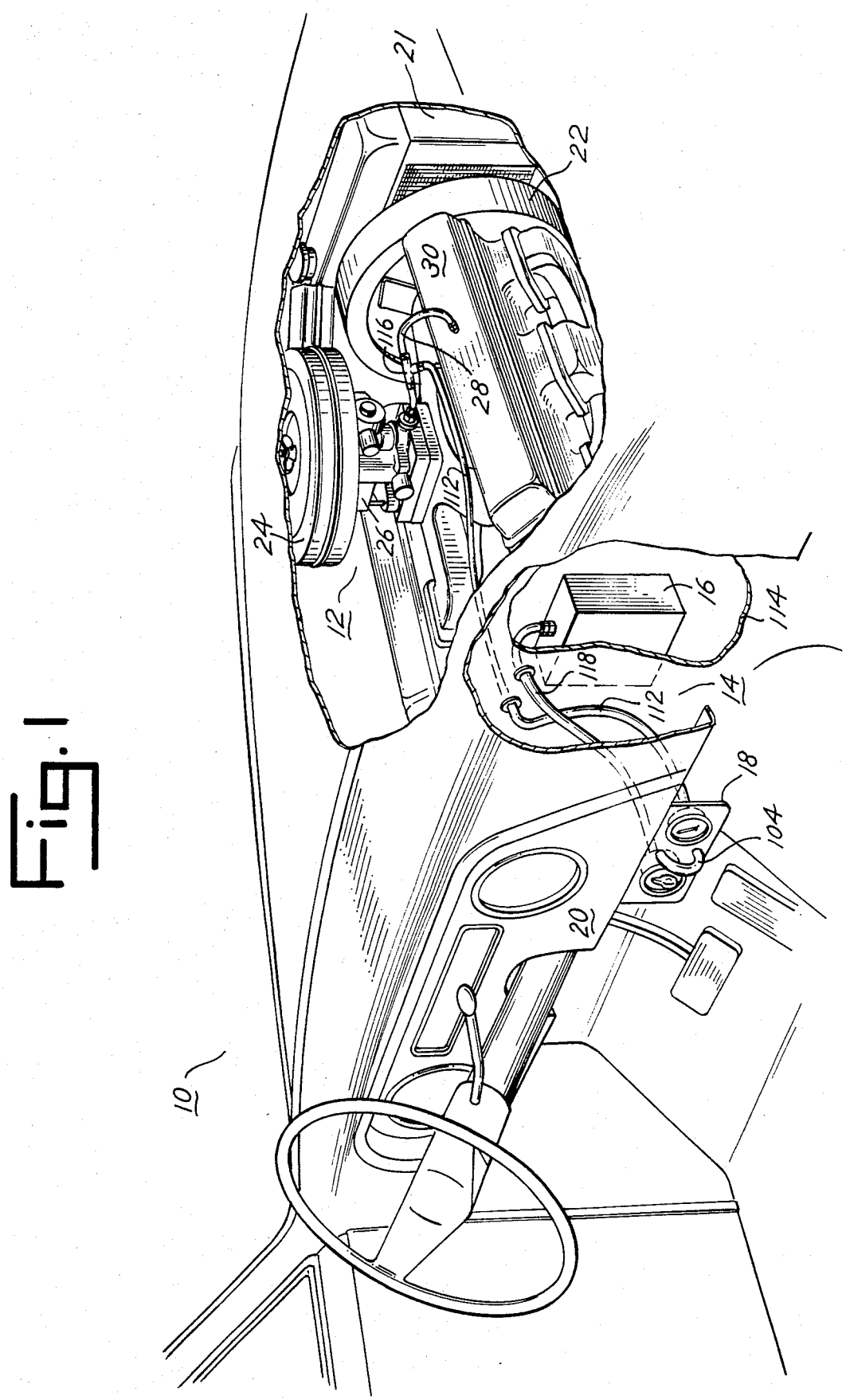
FIG. 1 is a perspective view, partially broken away, of an automobile engine and passenger compartment, showing a fluid injector embodying the present invention installed therein.

Referring more specifically to the drawings, and to FIG. 1 in particular, numeral 10 designates an automobile having an internal combustion engine 12 with a fluid injector 14 embodying the present invention, for injecting fluid into the air induction system of the engine on the engine side of the throttle. Injector 14 includes a fluid reservoir 16, normally located within the engine compartment of the automobile, and a control unit 18, normally mounted under the vehicle dashboard 20, or otherwise near the driver in the passenger compartment, so that the control is accessible to the driver, for regulating the amount of fluid injected into the cylinders to satisfy engine operating and environmental conditions.

Injector 14 works equally well on four cylinder, six cylinder or eight cylinder internal combustion engines: the V-8 engine 12, shown and described subsequently, is merely for demonstrative purposes. The engine includes a radiator 21, a fan housing 22, and an air filter 24 on a carburetor 26. A vacuum line 28 extends between carburetor 26 and a rocker arm cover 30. These features of engine 12 are described for clarity in understanding the location and operation of injector 14 and are not considered a part of the invention. A fluid injector of the present invention will be beneficial when used on an air cooled engine not having a radiator or fan, and other features of the engine may be changed without substantially affecting the operation or usefulness of the injector.

Control unit 18 includes a body 32, having wells or cups 34 and 36 extending rearwardly from a front panel 38. A flange 40 extends rearwardly from panel 38 above cups 34 and 36, and has holes 42 and 44 therein for mounting control unit 18 on the lower edge of the dashboard of the vehicle. Body 32, including cups 34 and 36, panel 38 and flange 40, may be of integral construction, for which plastic is a suitable material. Plastic of the A.B.S. type has been found particularly suitable for body 32, in that it provides the wear and machining characteristics required for the injector. The use of plastic significantly reduces sedimentation in the body, thereby minimizing the problem associated therewith.

A vacuum gauge 46 is disposed in cup 34 of body 32 and held therein by mounting bolts 48 and 50. Cup 36 has a back wall 60 and a side wall 62 extending between the back wall and front panel 38, and recess 63 is provided around the front edge of the cup for receiving a cover 64. The cover, side wall 62, and back wall 60 define an inner area or chamber 66 in which fluid and air mixing occurs. A recess 67, having a threaded side wall, is disposed in back wall 60, and an air inlet port 68 disposed in back wall 60 connects the recess to chamber 66. A threaded fixture 70, having a longitudinal opening 72 therein, is disposed in recess 67 and may be adjustably positioned therein. A fibrous packing material 74 is disposed in recess 67, behind fixture 70, and is compressed in the recess by the fixture when the fixture is threaded farther into the recess. Adjustment of fixture 70, to increase or decrease the compression of fibrous packing material 74, varies the amount of air which enters chamber 66 through inlet port 68, by blocking the entry of air into the port.

A fluid inlet port 80 is disposed in wall 60 and has a threaded portion 82 in which a valve member 84 is disposed. Valve member 84 has a longitudinal opening 86 therethrough, with an internal flange or ring 88 forming a constricted area 90 in the opening. A ball 92 is disposed behind ring 88, and a spring 94 biases ball 92 toward the ring, seating the ball on the ring to prevent back-flow and siphoning of fluid through the control when the engine is not running. A portion of back wall 60, around fluid inlet port 80, extends into chamber 66 and forms a tapering side wall 95 of the fluid inlet port. A threaded needle valve element 96, having a control knob 98, extends through cover 64 and has a tapered end 99 registerable in tapering side wall 95 of inlet port 80, for regulating the flow of fluid into chamber 66.

A fluid outlet port 100 in back wall 60 has a fitting 102 disposed therein, to which a transparent plastic line or hose 104 is attached. Normally, line 104 will pass through openings 106 and 108 in front panel 38 to form a loop in front of unit 18, so that the driver of the automobile may observe the fluid passing through the line. A union 110 joins line 104 to a line 112, which extends through the firewall 114 of the vehicle and is connected by a T-connector 116 to the vacuum line 28 between carburetor 26 and cover 30. A supply line 118 extends through firewall 114 and places valve member 84 in flow communication with reservoir 16. A filter may be provided on the end of line 118, and a breather is disposed in the reservoir. A vacuum line 120 extends between inner area 66 and vacuum gauge 46, so that a reading of the vacuum within cup 36 may readily be obtained by the operator from the driver's compartment.

In the installation and operation of a fluid injector embodying the present invention, the person desiring to use the injector will find a suitable location for reservoir 16 in the engine compartment, and will fasten the reservoir by straps or the like within the compartment. Similarly, a convenient location for mixing and control unit 18 will be found in the passenger compartment, and the unit will be attached by screws inserted through holes 42 and 44 of flange 40 into dashboard 20. Two holes are drilled in firewall 114 of the vehicle, and lines 112 and 118 are passed therethrough. In some automobiles, openings through firewall 114 may already exist through which the lines may be extended. The vacuum line 28 of the engine is located and severed, and T-connector 116 is placed in the vacuum line. Line 112 is connected to the T-connector on one end and to union 110 in line 104 on the other end. Chamber 66 in cup 36 is now in flow communication with the vacuum line of the vehicle. Line 118 is attached on one end to valve member 84, and the other end is lowered into reservoir 16. The reservoir is filled with water, and chamber 66 is then in flow communication with the water in the reservoir.

When the engine is running, the vacuum from the engine creates a vacuum in chamber 66 and ball 92 is forced against spring 94 in valve member 84 by the relatively positive pressure in line 118 compared to the lower pressure in chamber 66. The fluid in reservoir 16 flows through line 118 into chamber 66, and air enters the chamber through air inlet port 68, in that both fluid and air are "drawn" in by the vacuum from the engine. The air and water mix in chamber 66 and the mixture flows through outlet port 100, line 104, and line 112, to the vacuum line 28 of engine 12 and enters the intake manifold below the throttle. The mixture is vaporized by the heat from the engine, and distributed to the combustion cylinders to increase the compression therein and to humidify the fuel for a more complete and efficient burn.

The volume of air entering chamber 66 is controlled by adjustment of threaded fixture 70. By moving fixture 70 farther into recess 67, the fibrous packing material 74 is compressed and restricts the air passing through air inlet port 68, and by adjusting fixture 70 to move it farther out of recess 67, the fibrous packing material 74 is able to expand, and the larger spaces between the fibers will permit more air to pass therethrough and into chamber 66. The vacuum within chamber 66 is constantly monitored and measured by vacuum gauge 46, and the volume of air entering the chamber may be regulated to provide the desired vacuum in the chamber.

The volume of fluid entering chamber 66 is controlled by adjustment of needle valve element 96. When tapered end 99 of element 96 is moved farther into tapering side walls 95 of fluid inlet port 80, by turning knob 98, less fluid is able to flow into chamber 66, and by moving needle valve element 96 outwardly, greater amounts of fluid flow into chamber 66. When a fluid injector embodying the present invention is first installed on an older engine, a more moist air/fluid mixture is normally required than when the injector is installed on a new engine. The more moist mixture is needed to remove the carbon deposits that have built up on the cylinder walls and piston heads of the engine. After having run for awhile with the more moist mixture, the engine will have cleaned itself substantially, and a drier mixture may be used.

The present fluid injector is adjustable for meeting the specific requirements of the particular car in which it is installed. For any setting of valve element 96 some cars, especially newer compact models having lower vacuums, will draw less fluid into chamber 66 than will other cars having higher vacuums. The present injector 10 may be adjusted to compensate for the engine vacuum, hence permitting the injector to be transferred between engines having different vacuums. The injector is also easily adjusted for the particular atmospheric conditions in which the car is being operated. Thus, on moist and humid days the injector may be adjusted so that less fluid enters the unit to mix with the incoming air, since the air itself will provide some of the moisture. In drier climates, or on drier days, the driver may adjust the unit to provide more fluid from reservoir 16 to mix with the incoming air. For use in winter months, a small amount of alcohol should be added to the reservoir to prevent freezing of the fluid and damage to the fluid injector system.

When the engine is not running, valve member 84 prevents siphoning of fluid from the reservoir to control unit 18 and the engine, in that when the engine is not running the vacuum is discontinued, and spring 94 biases ball 92 against ring 88 to effectively shut off opening 86, thereby preventing the passage of fluid therethrough. Thus, the siphoning problem of prior injectors has been eliminated. Also, the plastic material used to form the housing and cups substantially reduces the amount of sediment buildup on the inner surfaces of the unit, and thereby minimizes malfunctioning due to blockage created by sediment. Normally, a reservoir of approximately one gallon will be sufficient to drive a distance of about 300 miles. Line 104, looped within view of the driver, provides a visual indication when the reservoir has run dry. As fluid passes through line 104, a bubbling action will be visible and the line will appear clear if no fluid is passing therethrough.

Although one embodiment of the fluid injector for internal combustion engines has been described in detail herein, various changes may be made without departing from the scope of the present invention.

I claim:

1. A fluid injector for supplying a fluid-air mixture to an internal combustion engine having a vacuum line thereon, said fluid injector comprising a body having a chamber for mixing fluid and air to be supplied to said engine, an air inlet port in said chamber for admitting ambient air to said chamber, a fluid inlet port in said chamber for admitting fluid into said chamber for mixing with the air entering said chamber through said air inlet port, a fluid reservoir for holding fluid to be supplied to said chamber, fluid flow means for placing said fluid inlet poit and said fluid reservoir in flow communication, an outlet port in said chamber through which the fluid-air mixture passes to flow to the engine, a second fluid flow means for placing said outlet port and the vacuum line of the engine in flow communication, adjustable valve means having a stem with a threaded portion holding the valve means in various fixed, adjusted positions irrespective of the vacuum transmitted to said chamber through said second fluid flow means, for regulating the volume of fluid entering said chamber, and pressure responsive shut off means in said inlet port for stopping the flow of fluid from said reservoir to said chamber through said first fluid flow means, said shut off means including a valve in said fluid inlet port, having an inwardly extending flange in said port, a ball for seating on said flange to close said port, and a spring for biasing said ball against said flange yieldable to vacuum in said chamber.

2. A fluid injector as defined in claim 1 in which a vacuum gauge is in communication with said chamber.

3. A fluid injector as defined in claim 1 in which said chamber includes a side wall, a back wall, and a cover, threaded walls define an opening in said cover, said fluid inlet port is disposed in said back wall in alignment with said opening in said cover, and said valve means is engageable with said threads of said opening in said cover and extends through said chamber into said fluid inlet port.

4. A fluid injector as defined in claim 3 in which a portion of said valve means extends outwardly through said cover, and a handle is disposed on said portion for adjusting said valve means.

5. A fluid injector as defined in claim 4 in which a portion of said back wall forms a recess having a base and a threaded side wall, said air inlet port communicates with said recess, fibrous filter material is disposed in said recess, and an adjustable fixture having a longitudinal opening therein is engageable with the threads in said recess for compressing said material to alter the flow of air through said air inlet port.

6. A fluid injector as defined in claim 5 in which a vacuum gauge is in communication with said chamber.

7. A fluid injector as defined in claim 6 in which a portion of said valve means extends out of said chamber, and a handle is disposed on said portion for adjusting said valve means.

8. A fluid injector as defined in claim 7 in which a section of said second fluid flow means is transparent, and said transparent section is disposed on the front of said body to be visible to the operator of the injector.

9. For use with an internal combustion engine: a fluid injector for supplying a fluid-air mixture to the combustion chambers, said fluid injector comprising: a body having portions thereof forming a chamber for mixing fluid and air, a side wall for said chamber, a back wall on said side wall, a front cover on said side wall closing said chamber, an air inlet port in said chamber for admitting ambient air to said chamber, a fluid inlet port in said chamber for admitting fluid into said chamber, walls of said fluid inlet port tapering inwardly away from said chamber, adjustable valve means having a stem with a threaded portion holding the valve means in various fixed adjusted positions, said valve means having a tapering end for extending into said tapering side walls of said fluid inlet port to control the volume of fluid flowing therethrough, a fluid reservoir for holding fluid to be mixed with air in said chamber, a first fluid flow means for transferring fluid from said reservoir to said chamber through said fluid inlet port, a pressure responsive valve means in said first fluid flow means for stopping the flow of fluid into said chamber when said engine is not operating, an outlet port in said chamber, and fluid flow means for transferring fluid-air mixture from said chamber to a vacuum line connected to the induction passage of said engine.

10. A fluid injector for supplying a fluid-air mixture to an internal combustion engine having a vacuum line thereon, said fluid injector comprising a body having a chamber for mixing fluid and air to be supplied to said engine, an air inlet port in said chamber for admitting ambient air to said chamber, a fluid inlet port in said chamber for admitting fluid into said chamber for mixing with the air entering said chamber through said air inlet port, a fluid reservoir for holding fluid to be supplied to said chamber, fluid flow means for placing said fluid inlet port and said fluid reservoir in flow communication, an outlet port in said chamber through which the fluid-air mixture passes to flow to the engine, a second fluid flow means for placing said outlet port and the vacuum line of the engine in flow communication, adjustable valve means having a stem with a threaded portion holding the valve means in various fixed, adjusted positions irrespective of the vacuum transmitted to said chamber through said second fluid flow means, for regulating the volume of fluid entering said chamber, pressure responsive shut off means in said inlet port for stopping the flow of fluid from said reservoir to said chamber through said first fluid flow means, and threaded walls defining a recess in said chamber body, said air inlet port communicating with said recess, fibrous filter material disposed in said recess, and an adjustable fixure having a longitudinal opening therein engageable with the threads in said recess for compressing said filter material to alter the flow of air through said air inlet port.

11. A fluid injector as defined in claim 9 in which a vacuum gauge is in communication with said chamber.

12. A fluid injector as defined in claim 9 in which threaded walls define an opening in said front cover, said fluid inlet port is disposed in said back wall in alignment with said opening in said cover, and said adjustment means includes a threaded member engaged with the threads of said opening in said cover extending through said cover and said chamber into said fluid inlet port.

13. A fluid injector as defined in claim 12 in which a vacuum gauge is in communication with said chamber.

14. A fluid injector as defined in claim 13 in which a section of said second fluid flow means is of transparent material, and said transparent section is disposed in front of said body to be visible by the operator of said injector.

15. A fluid injector as defined in claim 14 in which said back wall has a portion forming a side wall and base of a recess, said air inlet port communicates with said recess, fibrous filter material is disposed in said recess, said wall defining said recess is threaded, and an adjustable fixture, having a longitudinal opening therein, is engageable with the threads in said recess for compressing said material to control the volume of air flowing through said air inlet port.

* * * * *